(12) United States Patent
Mitsuo et al.

(10) Patent No.: US 8,128,121 B2
(45) Date of Patent: Mar. 6, 2012

(54) STEERING COLUMN MOUNTED KNEE AIRBAG DEVICE

(75) Inventors: Tetsu Mitsuo, Nissin (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 308 days.

(21) Appl. No.: 12/585,199

(22) Filed: Sep. 8, 2009

(65) Prior Publication Data

US 2010/0253050 A1    Oct. 7, 2010

(30) Foreign Application Priority Data

Apr. 2, 2009   (JP) ................................ 2009-089984

(51) Int. Cl.
*B60R 21/16* (2006.01)
*B60R 21/206* (2011.01)
*E60R 21/045* (2006.01)

(52) U.S. Cl. .................. 280/728.2; 280/730.1; 280/753

(58) Field of Classification Search .............. 280/728.2, 280/730.1, 731, 752, 753
See application file for complete search history.

(56) References Cited

U.S. PATENT DOCUMENTS

| | | | | |
|---|---|---|---|---|
| 5,312,129 | A * | 5/1994 | Ogawa ........................ | 280/728.2 |
| 6,598,823 | B1 * | 7/2003 | Fujii et al. .................. | 242/390.8 |
| 7,464,783 | B2 * | 12/2008 | Gray et al. ................. | 180/89.17 |
| 2007/0216140 | A1 * | 9/2007 | Yoshikawa et al. ........ | 280/730.1 |
| 2008/0174091 | A1 | 7/2008 | Hoshino et al. | |

FOREIGN PATENT DOCUMENTS

| | | |
|---|---|---|
| JP | A-2004-291735 | 10/2004 |
| JP | A-2005-335593 | 12/2005 |
| JP | A-2007-203937 | 8/2007 |
| JP | A-2008-114609 | 5/2008 |
| JP | A-2008-143444 | 6/2008 |
| JP | A-2008-174086 | 7/2008 |
| JP | A-2008-213591 | 9/2008 |
| JP | A-2008-222113 | 9/2008 |
| JP | A-2008-279856 | 11/2008 |
| WO | WO 2008/053664 A1 | 5/2008 |

OTHER PUBLICATIONS

Office Action issued Mar. 1, 2011 in Japanese Patent Application No. 2009-089984 (with translation).

* cited by examiner

*Primary Examiner* — Joseph Rocca
(74) *Attorney, Agent, or Firm* — Oliff & Berridge, PLC

(57) ABSTRACT

In a knee airbag device mounted on a steering column, an opening that provides a workspace when a wire harness connector that extends from the steering column is connected to a wiring connector provided at one end portion of an inflator is formed in a side wall of a lower cover (or column cover) opposite the connector of the inflator. By using the opening, the connector of the wire harness may be easily connected to the connector of the inflator, which is mounted transversely with respect to the axial direction of the steering column. The opening is closed by a lid.

1 Claim, 16 Drawing Sheets

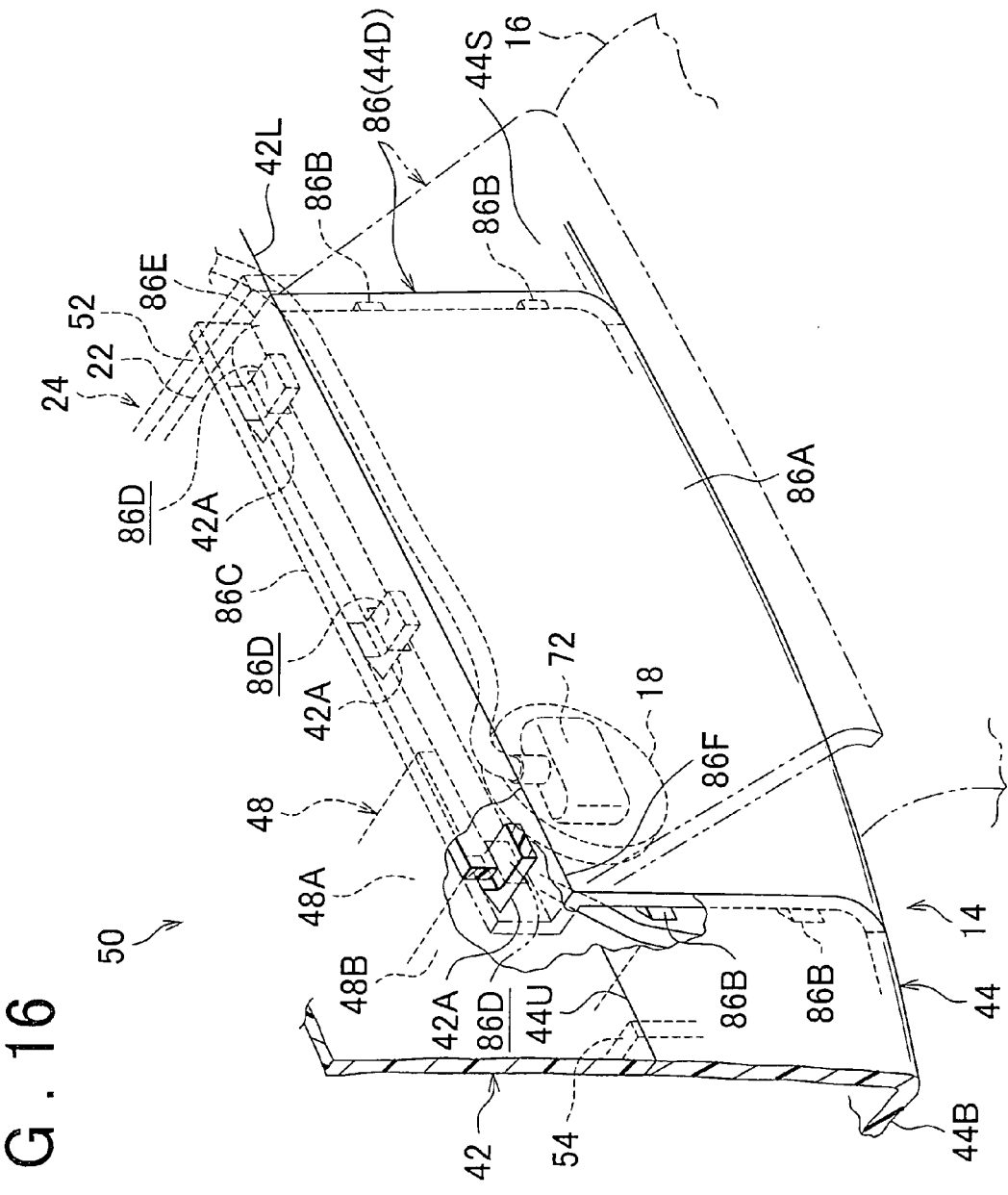

STEERING COLUMN MOUNTED KNEE AIRBAG DEVICE

INCORPORATION BY REFERENCE

The disclosure of Japanese Patent Application No. 2009-089984 filed on Apr. 2, 2009 including the specification, drawings and abstract is incorporated herein by reference in its entirety.

BACKGROUND OF THE INVENTION

1. Field of the Invention

The invention relates to a knee airbag device mounted on the steering column of a vehicle.

2. Description of the Related Art

A knee airbag device mounted on a steering column of a vehicle is described in, for example, Japanese Patent Application Publication No. 2008-114609 (JP-A-2008-114609). In the knee airbag device, an inflator (gas generating means) is disposed transversely with respect to the axial direction of the steering column, and is located closer to the rear of the module case 22 as viewed in the longitudinal direction of the vehicle.

Generally, the knee airbag module is installed in a steering column cover before it is mounted to the steering column. In addition, the connector of a wire harness that extends from the steering column is connected to a connector at one end of the inflator.

Where the inflator is mounted transversely as in the conventional example as described above, it is deemed necessary to connect a sub wire harness to the end of the inflator, or provide a workspace between the end of the inflator and a side wall of the steering column cover, for example, through upsizing of the steering column cover, in order to improve the efficiency and ease with which the wire harness is connected to the inflator.

SUMMARY OF THE INVENTION

The present invention provides a steering column mounted knee airbag device in which the inflator is disposed transversely with respect to the axial direction of the steering column, and which does not require a sub wire harness and is thus produced at reduced cost, using a small steering column cover.

A knee airbag device mounted on a steering column according to a first aspect of the invention includes a knee airbag module that is fixed to a vehicle lower side of the steering column, and has a folded knee airbag, an inflator that supplies gas to the knee airbag, and a module case that houses the knee airbag and the inflator; a wiring connector provided at one end of the inflator; a connector of a wiring harness that extends from the steering column and connects with the wiring connector of the inflator; a column cover that covers a rear end portion of the steering column. An opening is formed in a side wall of the column cover at a location opposite the wiring connector of the inflator and provides a space for connection between the connector of the wire harness and the wiring connector of the inflator; and a lid that closes the opening.

In the knee airbag device according to the first aspect of the invention, the opening is formed in the side wall of the column cover that is opposite the connector of the inflator. By using the opening as a workspace, the connector of the wire harness may be easily connected to the connector of the inflator, which is disposed transversely with respect to the axial direction of the steering column. The opening is closed by the lid. Thus, the knee airbag device does not require a sub wire harness and is thus produced at reduced cost, using a small column cover.

In the steering column mounted knee airbag device according to the first aspect of the invention, the opening may be a notch that is formed in a side wall of a lower cover that provides a vehicle-lower-side portion of the column cover and is open on one end side of the side wall, and the lid may be formed independently of the lower cover.

In the knee airbag device as described above, the opening that provides a workspace in the column cover is in the form of a notch that is formed in the side wall of the lower cover that provides the lower portion of the column cover and is open on one end side of the side wall. By using the notch as a workspace, the connector of the wire harness can be easily connected to the connector of the inflator that is disposed transversely with respect to the axial direction of the steering column. The lid is mounted in the notch so that the notch can be easily closed. Thus, the steering column mounted knee airbag device having a simple arrangement as described above does not require a sub wire harness and is thus produced at reduced cost, using a small column cover.

The lid may be formed on an upper cover that provides a vehicle-upper-side portion of the column cover so as to protrude downward as viewed in a vertical direction of the vehicle from a vehicle-lower-side end portion of the upper cover.

In the above arrangement, the lid is formed on the upper cover that provides the upper portion of the column cover so as to protrude downward from the lower end portion of the upper cover. With this arrangement, when the upper cover is mounted on the lower cover, the notch of the lower cover is closed by the lid. Thus, the closing of the notch of the lower cover and the mounting of the upper cover on the lower cover can be carried out at the same time, and an otherwise possible increase in the number of process steps can be avoided.

The opening may be formed in a side wall of a lower cover that provides a vehicle-lower-side portion of the column cover, and the lid may be integrally formed in the lower cover and is configured to be opened and closed via an integral hinge. The opening may be closed when the lid is engaged with a peripheral portion of the opening.

In the arrangement as described above, the opening that provides a workspace in the column cover is formed in the side wall of the lower cover that provides the lower portion of the column cover, and the lid is integrally formed in the lower cover and is opened and closed via the integral hinge. By opening the lid and using the opening as a workspace, the connector of the wire harness can be easily connected to the connector of the inflator. The lid is engaged with the peripheral portion of the opening so as to close the opening. Since the lid is integrally formed in the lower cover via the integral hinge, the lid does not increase the number of parts or components, and the opening is closed by the lid with improved efficiency and ease.

In the knee airbag device according to the first aspect of the invention, the column cover may be provided with an airbag door adapted to deploy when the knee airbag is deployed, and the lid may provide at least a part of the airbag door.

In the arrangement as described above, the column cover is provided with the airbag door which opens when the knee airbag is deployed, and the lid forms at least a part of the airbag door. It is therefore possible to provide a sufficiently large region for the airbag door in the side wall of the column cover, while providing the lid for closing the opening in the side wall of the column cover. With this arrangement, the knee airbag can be smoothly deployed toward the outside of the column cover in the vehicle width direction.

As explained above, the steering column mounted knee airbag device according to the first aspect of the invention provides excellent effects of reducing the cost by eliminating the sub wire harness, and using the small column cover.

Also, the knee airbag device having the simple arrangement as described above provides excellent effects of reducing the cost by eliminating the sub wire harness, and using the small column cover.

Furthermore, the knee airbag device having the lid protruding downward from the upper cover provides excellent effects of carrying out the closing of the notch of the lower cover and the mounting of the upper cover on the lower cover at the same time, and avoiding an otherwise possible increase in the number of process steps.

The knee airbag device having the lid integrally formed in the lower cover provides excellent effects of avoiding an increase in the number of parts or components, and improving the efficiency and easiness with which the opening is closed by the lid.

The knee airbag device in which the lid forms at least a part of the airbag door provides an excellent effect of smoothly deploying the knee airbag toward the outside of the column cover in the vehicle width direction.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 16 is an enlarged perspective view showing the lid when closed position, and showing, by means of imaginary lines, an airbag door that also serves as the lid when open, and a knee airbag is deployed toward the outside of the column cover in the vehicle width direction, in the fifth embodiment of FIG. 15.

DETAILED DESCRIPTION OF EMBODIMENTS

Example embodiments of the invention will be described with reference to the drawings.

Figure 1:
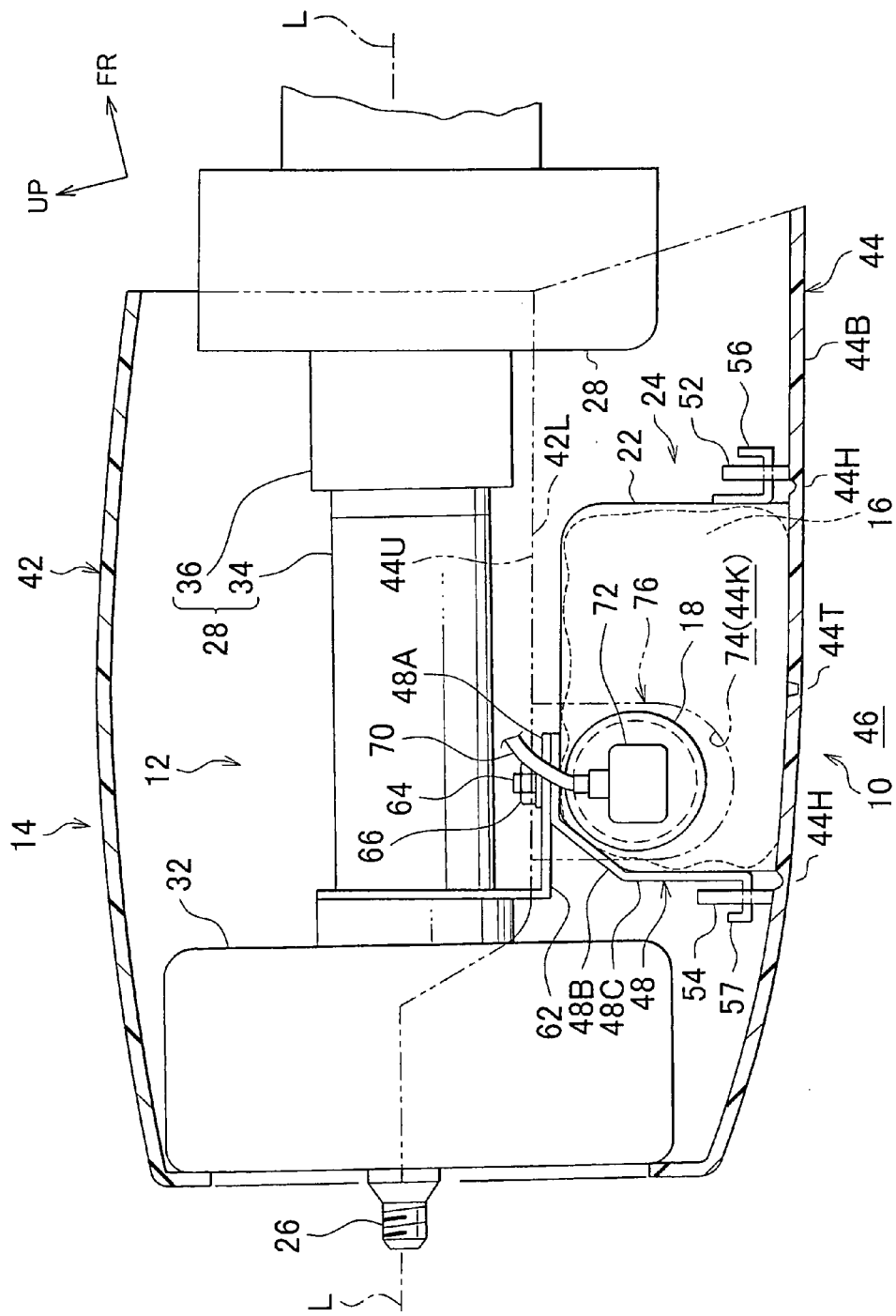
FIG. 1 is a cross-sectional view showing a steering column mounted knee airbag device according to a first embodiment of the invention.

Referring to FIG. 1, a knee airbag device mounted on a steering column 10 according to a first embodiment of the invention is fixed by fastening, for example, to a vehicle lower side of the steering column 12, in a column cover 14 that covers the rear end portion of the steering column 12. The steering column mounted knee airbag device 10 has a knee airbag module 24 that includes a knee airbag 16 that is folded, an inflator 18 that supplies gas to the knee airbag 16, and a module case 22 in which the knee airbag 16 and the inflator 18 are mounted.

The steering column 12 includes a steering shaft 26 located in the center portion of the steering column 12 to extend along the axis of the steering column 12, and a column tube 28 that covers the steering shaft 26. The steering column 12 is inserted through an opening (not shown) formed in an interior member such as an instrument panel (not shown), and protrudes toward the rear of the vehicle from the instrument panel. A combination switch 32 is provided in a rear end portion of the steering column 12. A steering wheel (not shown) for steering the vehicle is mounted on the rear end of the steering shaft 26.

The steering shaft 26 and the column tube 28 can be extended and contracted along the axis L of the steering column 12, for example, by an electrically operated tilt-telescopic mechanism (not shown). A column bracket 38 that supports the steering column 12 is provided on an outer tube 36 of the column tube 28, and the combination switch 32 and the knee airbag module 24 are provided on the vehicle lower side of an inner tube 34 of the column tube 28.

The column tube 28 has a double-tube structure consisting of the inner tube 34 located on the vehicle rear side and the outer tube 36 located on the vehicle front side. In this embodiment, the outer tube 36 has a larger diameter than the inner tube 34. When the steering column 12 receives a load equal to or greater than a threshold load from the steering wheel, for example, in the direction of the axis L of the steering column 12, the inner tube 34 moves forward in the direction of the axis L of the steering column 12, relative to the outer tube 36, so that the column tube 28 contracts, thereby absorbing the impact force. Although not illustrated in the drawings, when the column tube 28 contracts, resistance, such as frictional force, is produced between the inner tube 34 and the outer tube 36. With the resistance thus produced, the column tube 28 provides a higher impact absorbing capability even with a limited contraction stroke.

In FIG. 1, the column cover 14 has a split structure comprised of an upper cover 42 that forms an upper portion of the cover 14, and a lower cover 44 that forms a lower portion of the cover 14. The knee airbag module 24 is mounted in the lower cover 44 before it is mounted to the steering column 12.

More specifically, a front wall 52 and a rear wall 54 are integrally formed on the inner surface of the lower cover 44 to extend upright, namely, toward the steering column 12. The front wall 52 and rear wall 54 serve to control the direction of deployment of the knee airbag 16 to facilitate expansion and deployment of the knee airbag 16 toward a passenger compartment 46. The front wall 52 is located adjacent to the vehicle front side of the knee airbag module 24, and the rear wall 54 is located adjacent to the vehicle rear side of the knee airbag module 24. A plurality of through holes are formed in each of the front wall 52 and the rear wall 54, such that the through holes are aligned in the vehicle width direction. A plurality of hooks 56 are arranged in the vehicle width direction on a front edge of the module case 22, and a plurality of hooks 57 are arranged in the vehicle width direction on a rear edge of the module case 22. The front hooks 56 are engaged with the through holes of the front wall 52, and the rear hooks 57 are engaged with the through holes of the rear wall 54. The front hooks 56 are fixed, for example, by caulking to the module case 22.

The module case 22 is combined with a reinforcing plate 48 made of metal, for example. The reinforcing plate 48 is formed by bending a steel plate, for example, and consists of a top portion 48A that is disposed parallel to the axis L of the steering column 12 in the vehicle lower side of the steering 12, an inclined portion 48B that extends from the rear end of the top portion 48A toward the rear of the vehicle in a slanting, downward direction, and a rear portion 48C that extends downwards from the lower end of the inclined portion 48B. The rear hooks 57 of the module case 22 are provided on a lower edge of the rear portion 48C. The top portion 48A of the reinforcing plate 48 is positioned to overlap the inflator 18 as viewed in the direction of the axis L of the steering column 12, so that the reinforcing plate 48 can stably produce reaction force upon expansion and deployment of the knee airbag 16.

The knee airbag 16 is placed folded within the column cover 14 that covers the rear end portion of the steering column 12, and is configured to expand and deploy toward the outside of the column cover 14 (i.e., toward the passenger compartment 46) when gas is supplied from the inflator 18 into the knee airbag 16. More specifically, the knee airbag 16 is folded and the inflator 18 is incorporated within the folded knee airbag 16, for example, and is housed in the module case 22 made of fabric, or the like. The knee airbag 16 is configured to expand and deploy from the column cover 14 toward the passenger compartment 46, more particularly, toward the knees (not shown) of an occupant seated on the driver's seat, when gas is supplied from the inflator 18 into the knee airbag 16.

The inflator 18 is a gas supply or source that supplies the knee airbag 16 with gas to inflate the airbag 16. The inflator 18, which has a generally cylindrical shape, for example, is disposed in the knee airbag 16. The inflator 18 is placed on the vehicle lower side of the steering column 12 and extends in a direction perpendicular to the axis L of the steering column 12. In the module case 22, the inflator 18 is located closer to the rear end of the module case 22 as viewed in the longitudinal direction of the vehicle (in the module case 22 at an offset position from the center to the rear end as viewed in the longitudinal direction of the vehicle). In other words, the inflator 18 is located in a rear portion of the module case 22 as viewed in the longitudinal direction of the vehicle so as to extend in the vehicle width direction (i.e., the longitudinal direction of the inflator 18 is parallel to the vehicle width direction). This arrangement assures an increased contraction stroke of the steering column 12. It is to be understood that the "perpendicular" mentioned above is not limited to the geometric sense of the term, but may include "substantially or generally perpendicular".

Figure 2:
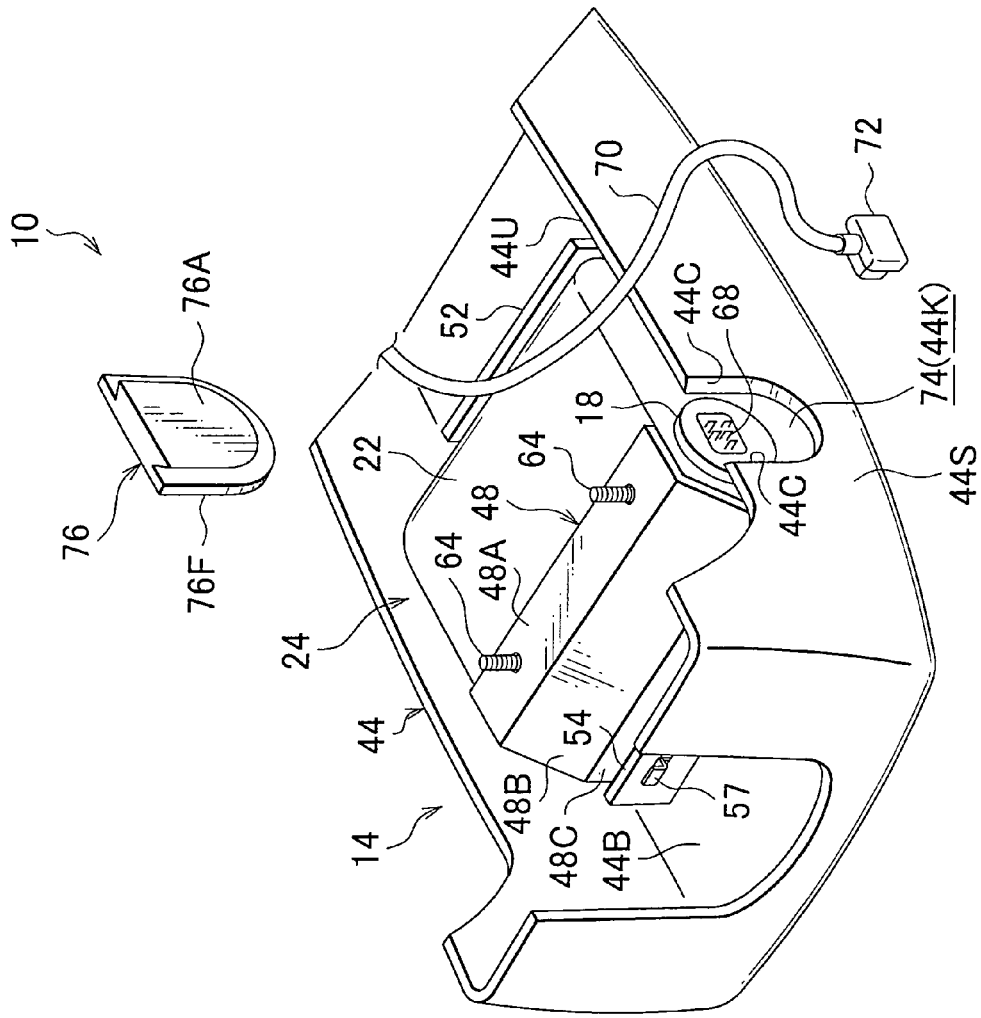
FIG. 2 is an exploded, perspective view showing the lower cover on which a knee airbag module is mounted, a wire harness, and the lid of the knee airbag device according to the first aspect of the invention.

As shown in FIG. 1 and FIG. 2, a connector 68 used for wiring is provided in, for example, a right-side end portion of the inflator 18 as viewed in the vehicle width direction. The connector 72 of a wire harness 70 that extends from the steering column 12 is connected to the connector 68. An air bag ECU is configured to cause actuating current to pass through the inflator 18 via the wire harness 70 when it determines that a front collision has occurred based on a signal from an impact sensor (not shown).

An L-shaped (when viewed from the side) mounting bracket 62, for example, is fixed to the inner tube 34 of the steering column 12. Stud bolts 64 that are erected on the inflator 18 extend through the knee airbag 16, module case 22, reinforcing plate 48 and the mounting bracket 62, and nuts 66 are fastened to the ends of the stud bolts 64 that project through the mounting bracket 62. In this manner, the knee airbag module 24 is mounted, along with the lower cover 44, to the vehicle lower side of the steering column 12.

As shown in FIG. 1, a tear line 44T along which the lower cover 44 is expected to be torn is formed in the vehicle width direction in a bottom wall 44B of the lower cover 44 of the column cover 14, and hinge portions 44H are formed at a base portion of the bottom wall 44B located at the vehicle rear side of the front wall 52, and in a base portion of the bottom wall 44B located at the vehicle front side of the rear wall 54. In the initial stages of deployment of the knee airbag 16, the inflation pressure of the knee airbag 16 acts on the lower cover 44, to tear the lower cover 44 open along the tear line 44T, so that an airbag door provided by a part of the bottom wall 44 opens in the vehicle longitudinal direction or width direction, for example, while pivoting about the hinge portions 44H. With the airbag door thus opened, the knee airbag 16 is deployed toward the passenger compartment 46.

Referring to FIG. 1 through FIG. 6, an opening 44K that provides a workspace for connecting the connector 72 of the wire harness 70, which extends from the steering column 12 to the connector 68, is formed in a side wall of the column cover 14 opposite the connector 68 provided in one end portion of the inflator 18. The opening 44K, which is in the form of a notch 74, is formed in the side wall 44S of the lower cover 44, and is open on the upper side 44U (or top face) of the side wall 44S. The opening 44K (or notch 74) is closed by a lid 76 after the wire harness 70 is connected to the inflator 18. The lid 76 is mounted from the upper side of the vehicle and received in the notch 74. The opening 44K is larger than the connector 72 of the wire harness 70.

Figure 3:
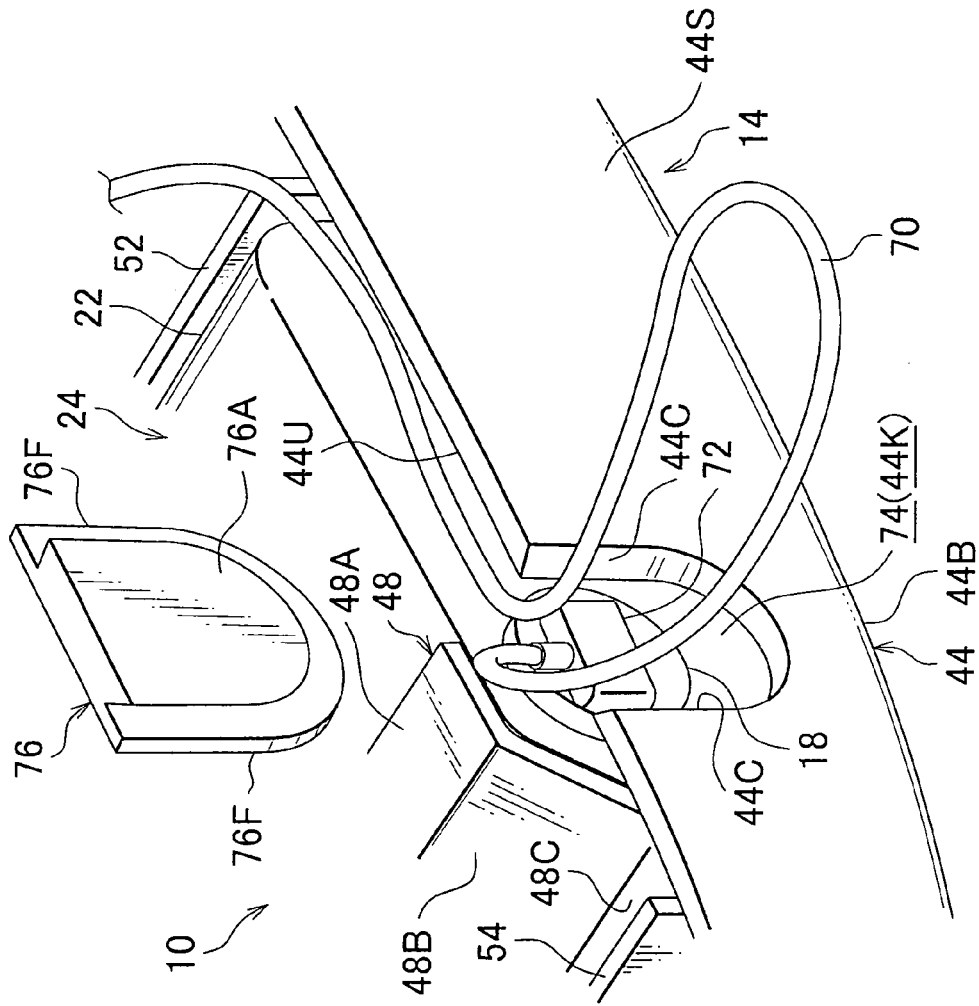
FIG. 3 is an enlarged, exploded perspective view showing the connection of a wire harness connector to an inflator connector using an opening of the lower cover according to the first embodiment of the invention.
Figure 6:
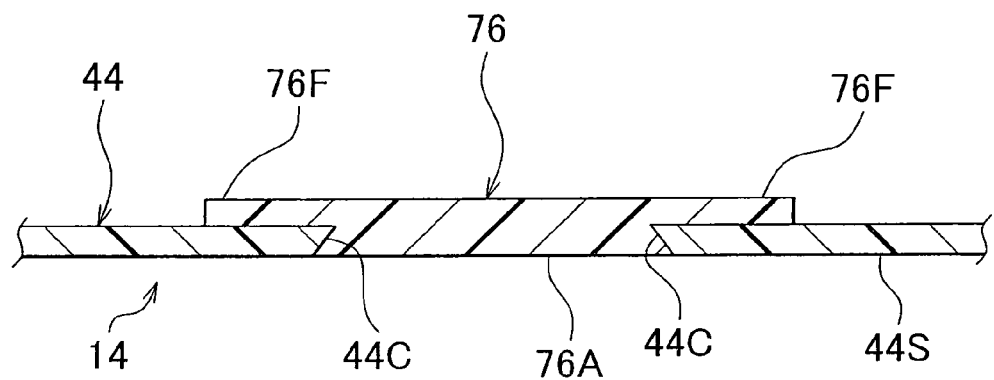
FIG. 6 is a cross-sectional view as seen in the direction of arrows VI-VI in FIG. 5, showing the lid when mounted in the opening of the lower cover.

More specifically, the width of the notch 74 is sufficient to permit the connector 72 of the wire harness 70 to pass through the notch 74 to connect to the connector 68 of the inflator 18. The upper end of the notch 74 is open on the upper side 44U of the side wall 44S, and a lower end portion of the notch 74 is formed in the shape of an arc, for example. As shown in FIG. 1 through FIG. 3, front and rear edges 44C of the notch 74 extend in parallel with each other in a direction perpendicular to or substantially perpendicular to the direction of the axis L (FIG. 1) of the steering column 12, for example. Also, as shown in FIG. 6, the front and rear edges 44C may be beveled, such that the corner of each of the front and rear edges 44C at the inner surface of the lower cover 44 has an acute angle, and the corner of each of the front and rear edges 44C at the outer surface of the lower cover 44 has an obtuse angle. Namely, the front and rear edges 44C form with bevel surfaces.

Figure 5:
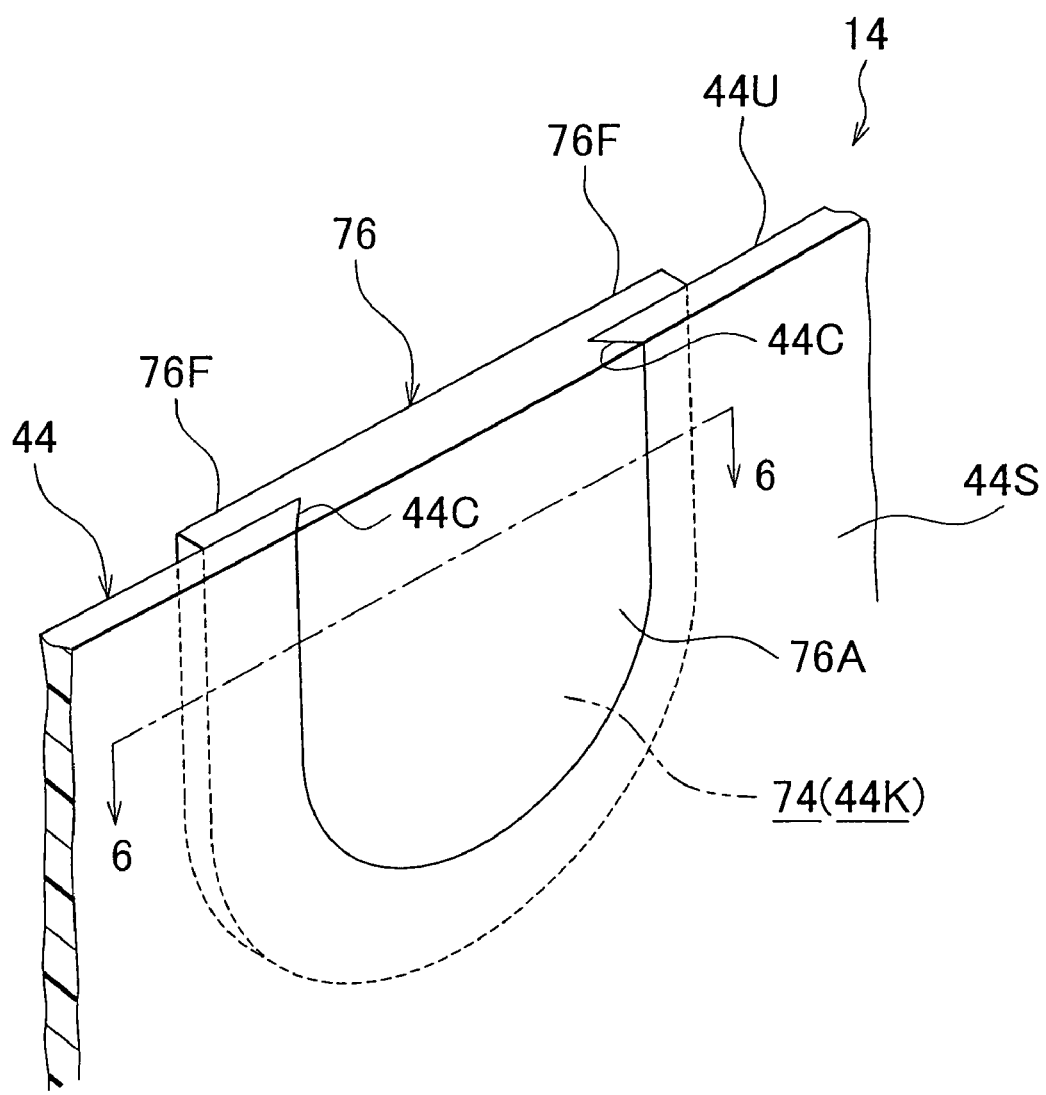
FIG. 5 is an enlarged perspective view showing the lid when mounted in the opening of the lower cover.

Accordingly, the lid 76 is configured to be engaged with the bevel surfaces of the front and rear edges 44C. More specifically, the lid 76 has a flange portion 76F that contacts the inner surface of the side wall 44S of the lower cover 44 when the lid 76 is mounted in the notch 74, and a trapezoidal portion 76A engaged between the bevel surfaces of the front and rear edges 44C. As shown in FIG. 5 and FIG. 6, the trapezoidal portion 76A of the lid 76 is received in the notch 74 such that the outer face of the trapezoidal portion 76A is flush with the outer surface of the side wall 44S of the lower cover 44.

It is to be understood that the engagement of the lid 76 with the notch 74 is not limited to that between the lid 76 and the bevel surfaces of the edges 44 as described above, but other types of engagement may be employed provided that the lid 76 can be mounted from the upper side of the vehicle to be received in the notch 74.

The operation of the first embodiment constructed as described above will now be described. In the steering column mounted knee airbag device 10 as shown in FIG. 2 and FIG. 3, the column cover 14 has a split structure having the upper cover 42 and the lower cover 44. The opening 44K provides a workspace when the connector 72 of the wire harness 70, which extends from the steering column 12, is connected to the connector 68, and is formed in the side wall 44S of the lower cover 44 facing the connector 68. The opening 44K is in the form of the notch 74 that is formed in the side wall 44S of the lower cover 44 and is open on the upper side or top face of the side wall 44S.

Thus, by using the notch 74 as a workspace, the connector 72 of the wire harness 70 can be easily connected to the connector 68 of the inflator 18. Accordingly, when the knee airbag module 24 is installed on the lower cover 44, there is no need to connect a sub wire harness (not shown) to an end portion of the inflator 18 so as to pull wiring out of the inflator 18.

After the connection of the wire harness 70 to the connector 68 of the inflator 18, the wire harness 70 is pulled into the lower cover 44, and the lid 76 is mounted from the upper side of the vehicle to be received in the notch 74. In this manner, the notch 74 can be easily closed. Since the lid 76 is fitted in the dovetail groove and with the notch 74, an operation to mount the lid 76 in the notch 74 can be smoothly carried out even if a space between the side wall 44S of the lower cover 44 and the inflator 18 is small.

With the lid 76 thus mounted in the notch 74, the outer face of the trapezoidal portion 76A of the lid 76 is flush with the outer surface of the side wall 44S of the lower cover 44 such that the lid 76 appear to be integrated with the lower cover 44.

Figure 4:
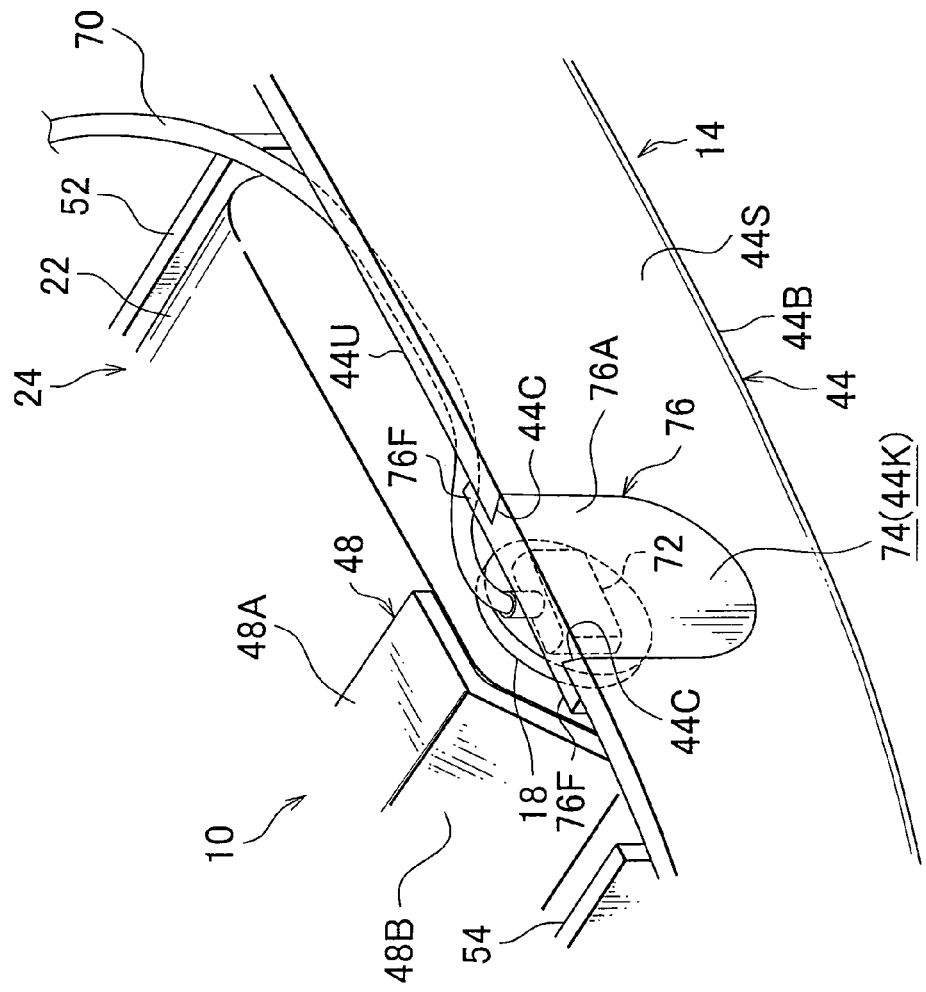
FIG. 4 is an enlarged perspective view showing the opening of the lower cover when closed by a lid.

Thus, the lid 76 does not degrade the appearance of the column cover 14. Furthermore, the upper end or top face of the lid 76 is flush with the upper end or the top face 44U of the side wall 44S, as shown in FIG. 4. Therefore, when the upper cover 42 is mounted on the lower cover 44, as shown in FIG. 1, no redundant clearance is formed between the lower end (i.e., bottom face) 42L of the upper cover 42 and the lid 76, and between the lower end 42L and the upper side (i.e., top face) 44U of the lower cover 44. Although not illustrated in the drawings, the outer face of the trapezoidal portion 76A of the lid 76 is also flush with the outer surface of a side wall of the upper cover 42.

As is understood from the above, the steering column mounted knee airbag device 10 according to the first embodiment of the invention is simply constructed to eliminate the need to provide a sub wire harness (not shown) and thus reduce the cost of production, while reducing the size of the column cover 14.

With the lid 76 mounted in the notch 74, the flange 76F of the lid 76 contacts the inner surface of the side wall 44S of the lower cover 44. With this arrangement, even if the inflation pressure of the knee airbag 16 is applied to the lid 76 upon expansion and deployment of the knee air bag 16, the lid 76 will not be detached from the lower cover 44.

Figure 7:
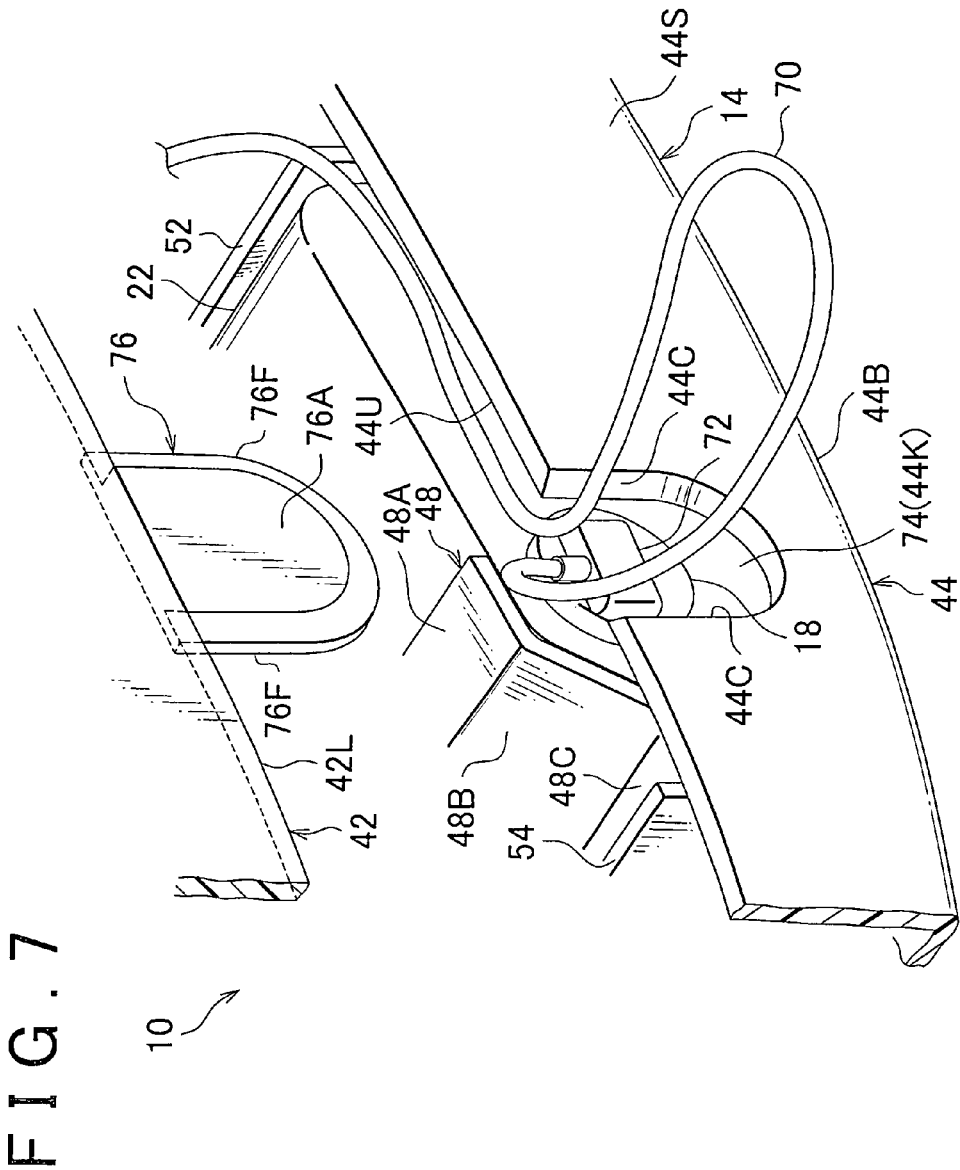
FIG. 7 is an exploded perspective view showing the connection of the wire harness connector to the inflator connector, using the opening formed in the lower cover of the column cover, according to a modified example of the first embodiment.

While the lid 76 is formed independently of the lower cover 44 and the upper cover 42 in the embodiment as shown in FIG. 1 through FIG. 6, the lid 76 may be formed as an integral part of the upper cover 42, as shown in FIG. 7. In this example, the lid 76 protrudes downward from the lower end (or bottom face) 42L of the upper cover 42.

Figure 8:
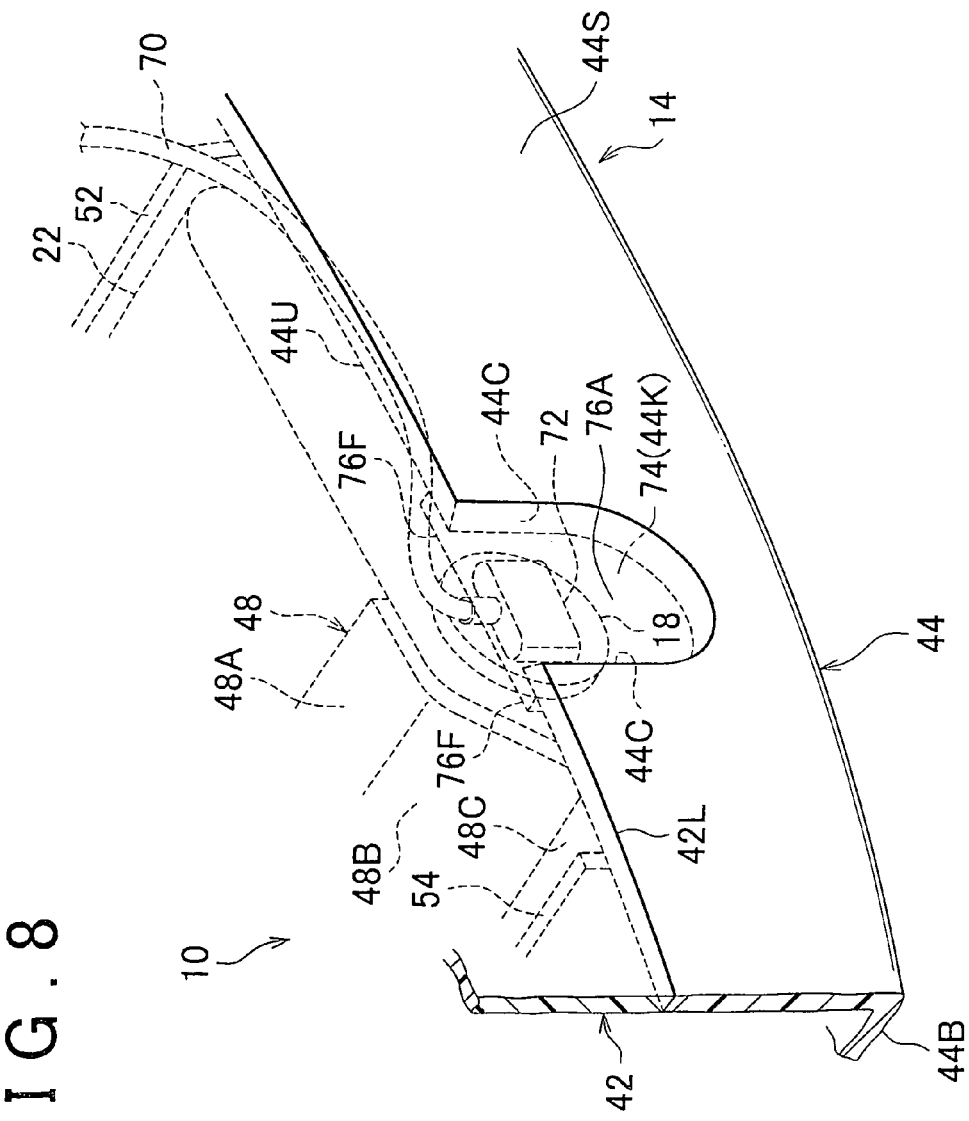
FIG. 8 is a perspective view showing the upper cover when mounted on the lower cover in the modified example of FIG. 7.

With the above arrangement, when the upper cover 42 is mounted on the lower cover 44 after the connector 72 of the wire harness 70 is connected to the connector 68 of the inflator 18, as shown in FIG. 8, the notch 74 of the lower cover 44 is closed by the lid 76. Thus, the closing of the notch 74 of the lower cover 44 and the mounting of the upper cover 42 on the lower cover 44 may be carried out at the same time, and the number of process steps can be thus reduced.

In the first embodiment of the invention, an airbag door (not shown) may be set in the side wall 44S of the lower cover 44.

Figure 9:
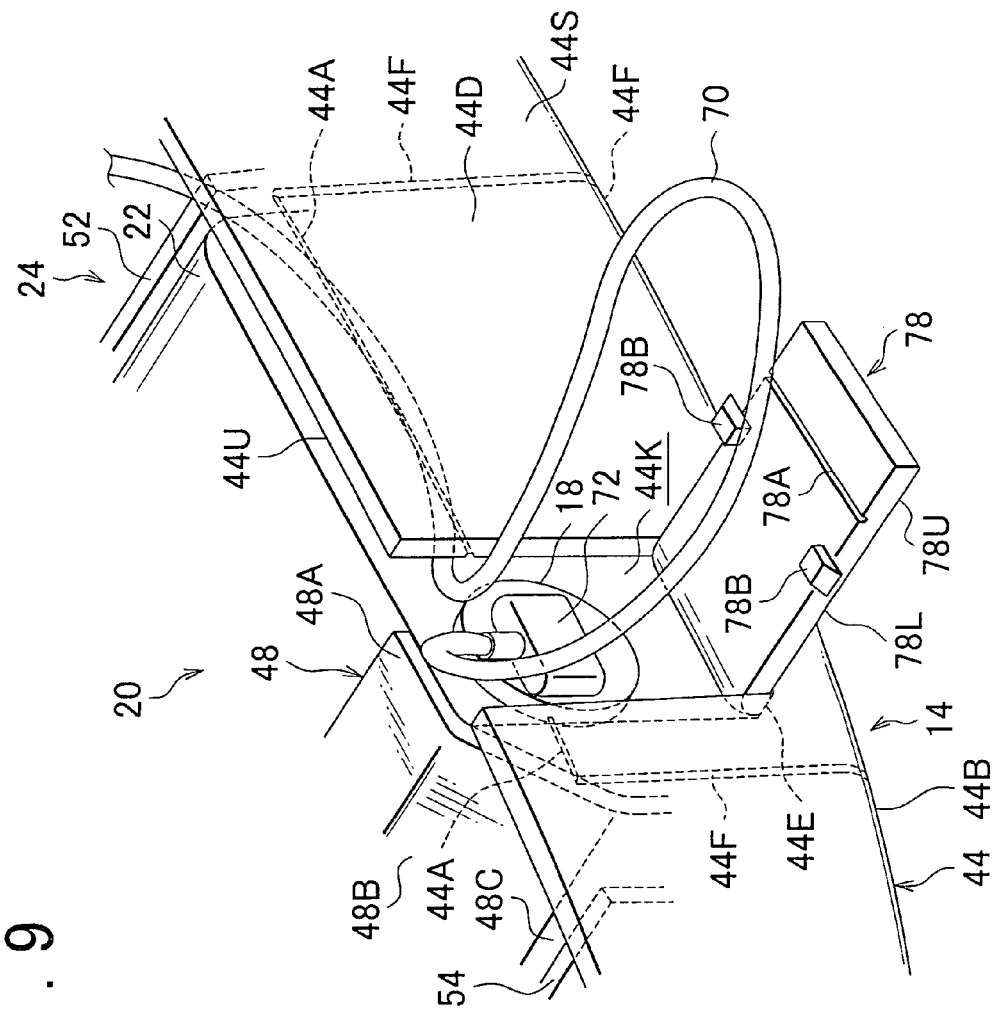
FIG. 9 is an enlarged perspective view showing the connection of the wire harness connector connected to the inflator connector using an opening formed when a lid is in an open position according to a second embodiment of the invention.

In a steering column mounted knee airbag device 20 according to a second embodiment of the invention, as shown in FIG. 9, an opening 44K that provides a workspace when the connector 72 of the wire harness 70 is connected to the connector 68 (see FIG. 2) of the inflator 18 is formed in the side wall 44S of the lower cover 44 of the column cover 14. Also, the opening 44K may be formed as a rectangular notch or aperture that is open to the vehicle-upper-side end portion (or top face) 44U of the side wall 44S.

After the connector 72 of the wire harness 70 is connected to the connector 68 (see FIG. 2) of the inflator 18, engaging protrusions 78B, or the like, of a lid 78 are engaged with a peripheral portion of the opening 44K so that the opening 44K is closed by the lid 78. The lid 78 is integrally formed in the lower cover 44, such that the lid 78 may be opened and closed while pivoting about an integral hinge 44E (see FIG. 10).

Figure 10:
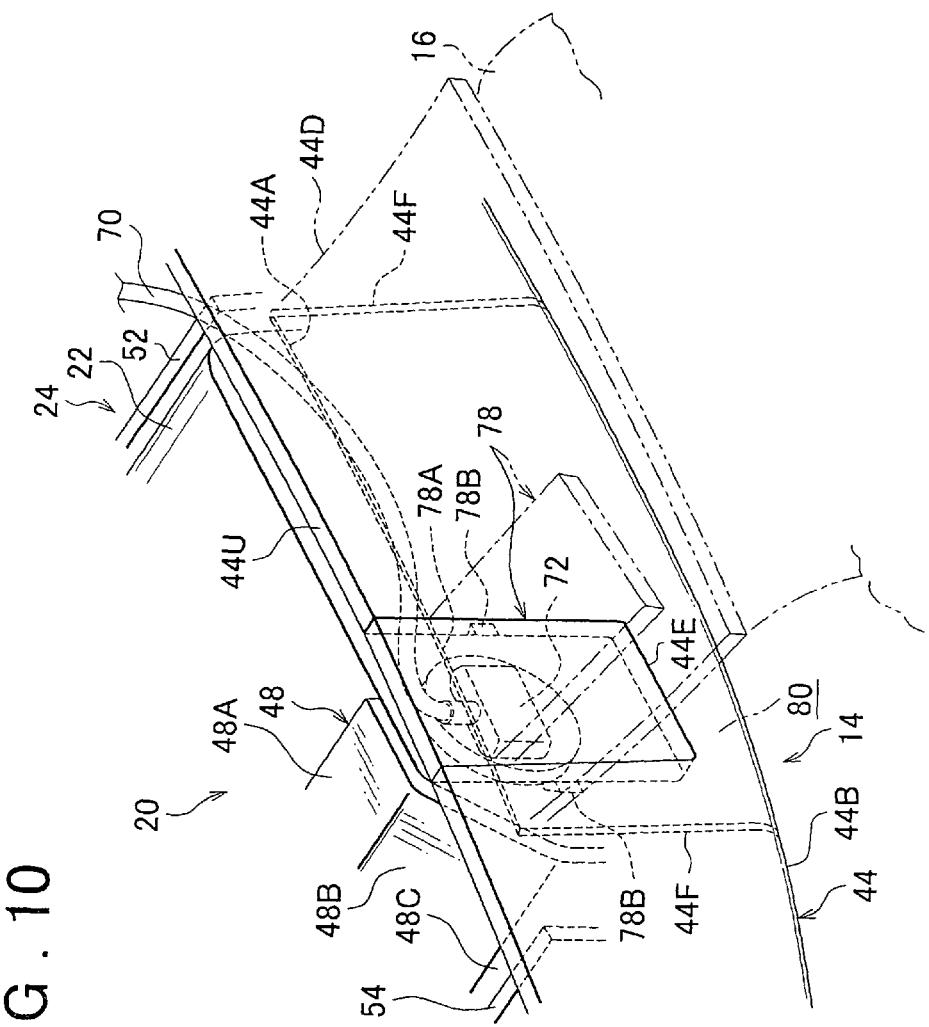
FIG. 10 is an enlarged perspective view showing the lid when closed, and showing, by means of imaginary lines, an airbag door including a lower portion of the lid opens, and a knee airbag is deployed toward the outside of the column cover in the vehicle width direction, in the second embodiment of FIG. 9.

An airbag door 44D that opens toward the outside of the column cover 1s4 in the vehicle width direction under the inflation pressure of the knee airbag 16 is set in a region of the side wall 44S of the lower cover 44, for example, opposite the knee airbag module 24 in the vehicle width direction. The airbag door 44D, which forms a part of the lower cover 44, is provided at its front end, rear end and lower end with respective tear lines 44F, and is also provided at its upper end with a hinge portion 44A as an integral hinge. As shown in FIG. 10, when the knee airbag 16 is deployed, the lower cover 44 is torn along the tear lines 44F under the inflation pressure of the knee airbag 16, so that the airbag door 44D opens toward the outside of the column cover 14 in the vehicle width direction while pivoting about the hinge portion 44A. The knee airbag 16 is deployed toward the outside of the column cover 14 in the vehicle width direction through an opening 80, formed when the airbag door 44D opens.

As shown in FIG. 9 and FIG. 10, a hinge portion 78A that is aligned with the hinge portion 44A of the side wall 44S is formed in the lid 78. When the opening 44K is closed by the lid 78, a portion of the lid 78 located on the vehicle upper side of the hinge portion 78A is referred to as an upper portion 78U, and a portion of the lid 78 located on the vehicle lower side of the hinge portion 78A is referred to as a lower portion 78L. The engaging protrusions 78B that engage with the peripheral portion of the opening 44K when the opening 44K is closed by the lid 78 are formed as integral parts of the lid 78 at opposite end portions of the lower portion 78L as viewed in the longitudinal direction of the vehicle. The lid 78 forms at least a part of the airbag door; more specifically, the lower portion 78L forms a part of the airbag door 44D.

Although not illustrated in the drawings, the upper portion 78U may also be configured to be engaged with the peripheral portion of the opening 44K. With this arrangement, the upper portion 78U of the lid 78 is prevented from becoming detached from the lower cover 44 when the airbag door 44D opens.

The other components of the knee airbag device 20 of the second embodiment are similar to those of the first embodiment, and therefore, the same reference numerals used in the first embodiment are used to identify the same portions or elements, for which no explanation will be provided.

The operation of the second embodiment constructed as described above will now be described. In the steering column mounted knee airbag device 20 according to the second embodiment, as shown in FIG. 9, the opening 44K is formed in the side wall 44S of the lower cover 44, and the lid 78 is integrally formed in the lower cover 44, and is pivotable about the integral hinge 44. With this arrangement, by opening the lid 78 and using the opening 44K, the connector 72 of the wire harness 70 may be easily connected to the connector (not shown) of the inflator 18.

Accordingly, when the knee airbag module 24 is installed on the lower cover 44, there is no need to connect a sub wire harness (not shown) to an end portion of the inflator 18 to pull wiring out of the inflator 18.

After the wire harness 70 is connected to the inflator 18, the wire harness 70 is pulled into the lower cover 44, and the engaging protrusions 78B of the lid 78 are engaged with the peripheral portion of the opening 44K, as shown in FIG. 10. In this manner, the opening 44K may be easily closed. With the opening 44K thus closed by the lid 78, the outer face of the lid 78 is flush with the outer surface of the side wall 44S of the lower cover 44 so that the lid 78 appear to be integrated with the lower cover 44. Thus, the lid 78 does not degrade the appearance of the column cover 14.

In this embodiment in which the lid 78 is integrally formed in the lower cover 44 by the integral hinge 44E, the provision of the lid 78 does not increase the number of parts or components, and the opening 44K is closed by the lid 78 with improved efficiency and ease.

If the airbag ECU determines that a frontal collision of the vehicle has occurred based on a signal from an impact sensor (not shown), the airbag ECU causes actuating current to pass through the inflator 18. Upon receipt of the actuating current, the inflator 18 expels a large amount of gas through a gas discharge hole. The gas thus expelled is supplied into the knee airbag 16, so that the knee airbag 16 is inflated to expand.

When the inflation pressure of the knee airbag 16 is applied to the side wall 44S of the lower cover 44 of the column cover 14, the side wall 44S is torn along the tear lines 44F at the periphery of the airbag door 44D, and the airbag door 44D opens about the hinge portions 44A, 78A toward the outside of the column cover 14 in the vehicle width direction. The knee airbag 16 is deployed toward the outside of the column cover 14 in the vehicle width direction through an opening 80, formed when the airbag door 44D opens. As a result, the knee airbag 16 promptly enters a space between the knees (not shown) of the occupant and the instrument panel (not shown) located in front of the knees, thereby to quickly restrain the knees.

In this embodiment in which the lid 78 forms at least a part of the airbag door 44D. When the airbag door 44D pivots about the hinge portion 44A, the lower portion 78L of the lid 78 also pivots about the hinge portion 78A along with the airbag door 44D, while the upper portion 78U remains in the side wall 44S. Thus, the airbag door 44D can be provided in the side wall 44S of the column cover 14 while the lid 78 for closing the opening 44K is also provided in the side wall 44S. With this arrangement, the knee airbag 16 may be smoothly deployed toward the outside of the column cover 14 in the vehicle width direction.

Figure 11:
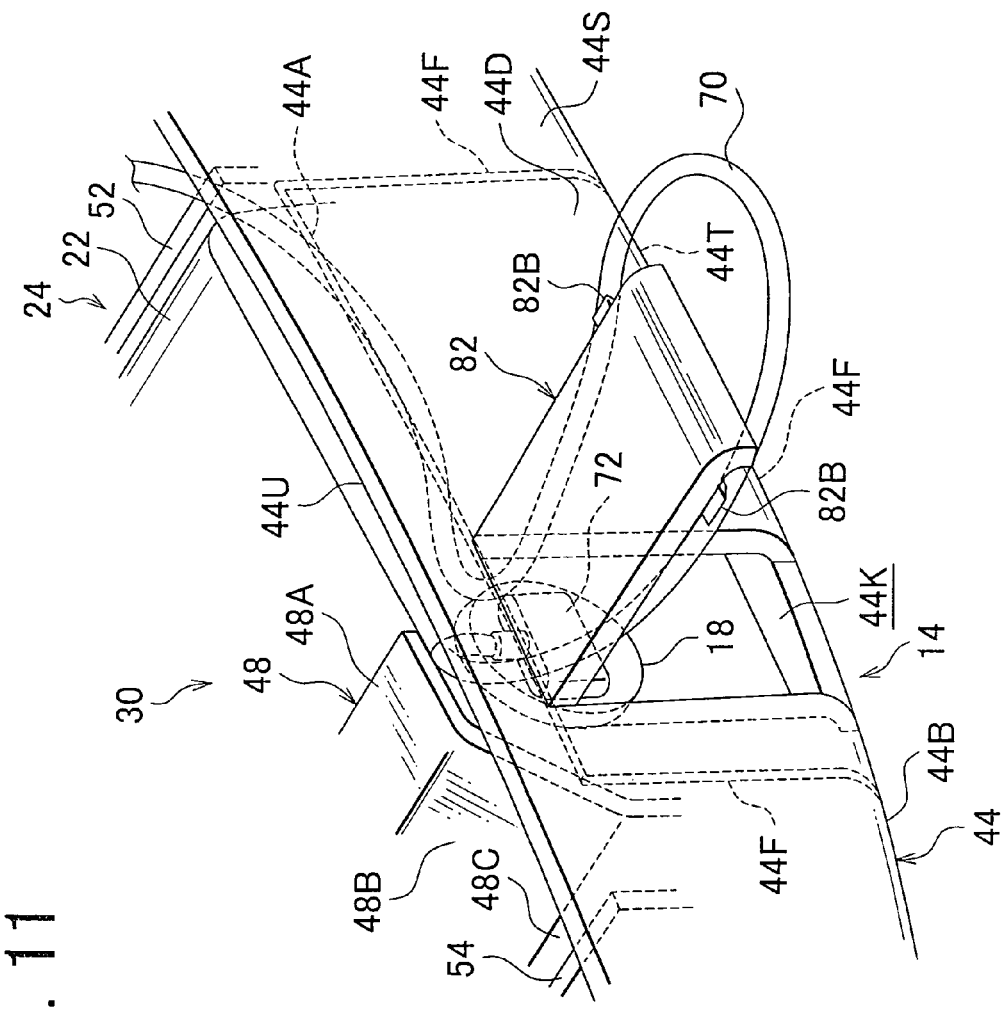
FIG. 11 is an enlarged perspective view showing the wire harness connector when connected to the inflator connector, using an opening formed when a lid is open according to a third embodiment of the invention.

In a steering column mounted knee airbag device 30 according to a third embodiment of the invention, as shown in FIG. 11, an opening 44K is formed in the side wall 44S of the lower cover 44. The opening 44K (see FIG. 2) is formed in the side wall 44S as a rectangular through-hole, for example, and the opening 44K ranges from an upper-end hinge portion 44A of the airbag door 44D to a lower-end tear line 44F of the side wall 44S as a boundary between the side wall 44S and the bottom wall 44B of the lower cover 44.

After the connector 72 of the wire harness 70 is connected to the connector 68 (see FIG. 2) of the inflator 18, engaging protrusions 82B, or the like, of a lid 82 are engaged with the peripheral portion of the opening 44K, so that the opening 44K is closed by the lid 82. The lid 82 is integrally formed in the lower cover 44, and is provided within the region of the airbag door 44D, such that the lid 82 may be opened and closed while pivoting about the hinge portion 44A. Namely, the entirety of the lid 82 forms part of the airbag door 44D.

The other components of the knee airbag device 30 of the third embodiment are similar to those of the first embodiment or the second embodiment, and therefore, the same reference numerals used in the first and second embodiments are used to identify the same portions or elements, for which no explanation will be provided.

The operation of the third embodiment constructed as described above will now be described. In the steering column mounted knee airbag device 30 according to the third embodiment, as shown in FIG. 11, the opening 44K is formed in the side wall 44S of the lower cover 44, and the lid 82 is integrally formed in the lower cover 44, and is pivotable about the hinge portion 44A. With this arrangement, by opening the lid 82 and using the opening, the connector 72 of the wire harness 70 may be easily connected to the connector (not shown) of the inflator 18.

Accordingly, when the knee airbag module 24 is installed on the lower cover 44, there is no need to connect a sub wire harness (not shown) to an end portion of the inflator 18.

Figure 12:
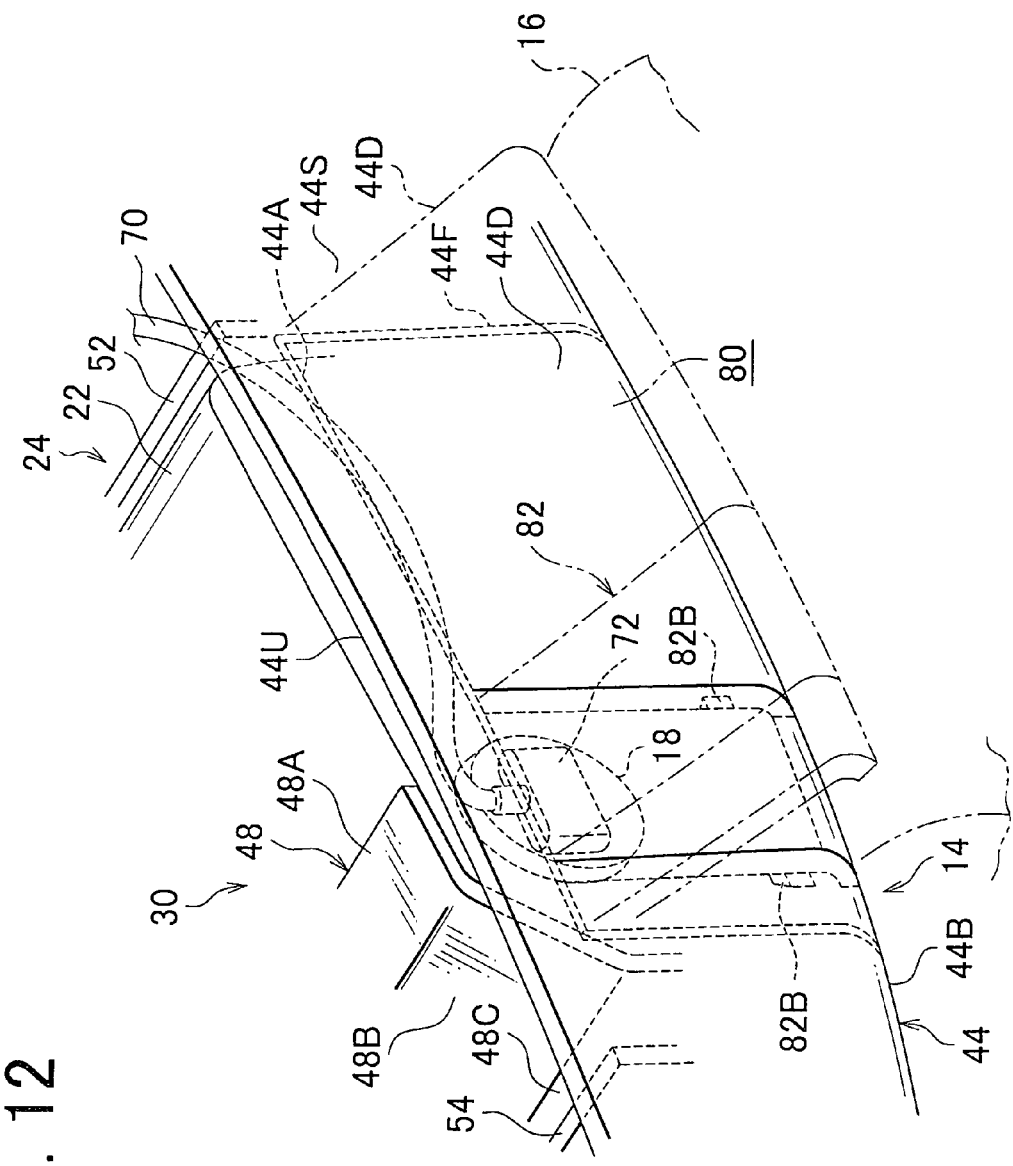
FIG. 12 is an enlarged perspective view showing the lid when closed, and showing, by means of imaginary lines, an airbag door that includes the lid when open, and a knee airbag is deployed toward the outside of the column cover in the vehicle width direction, in the third embodiment of FIG. 11.

After the wire harness 70 is connected to the inflator 18, the wire harness 70 is pulled into the lower cover 44, and the engaging protrusions 82B of the lid 82 are engaged with the peripheral portion of the opening 44K, as shown in FIG. 12. In this manner, the opening 44K may be easily closed. With the opening 44K thus closed by the lid 82, the outer face of the lid 82 is flush with the outer surface of the side wall 44S of the lower cover 44, and the lid 82 appear to be integrated with the lower cover 44. Thus, the lid 82 does not degrade the appearance of the column cover 14.

In this embodiment, the lid 82 is integrally formed in the lower cover 44 by the hinge portion 44A, the provision of the lid 82 does not increase the number of parts or components, and the opening 44K is closed by the lid 82 with improved efficiency and ease.

When the knee airbag 16 is deployed, the inflation pressure of the knee airbag 16 is applied to the side wall 44S of the lower cover 44. Then, the side wall 44S is torn along tear lines 44F at the periphery of the airbag door 44D, and the airbag door 44D opens toward the outside of the column cover 14 in the vehicle width direction while pivoting about the hinge portion 44A. The knee airbag 16 is deployed toward the outside of the column cover 14 in the vehicle width direction through an opening 80, formed when the airbag door 44D opens. As a result, the knee airbag 16 promptly enters the space between the knees (not shown) of the occupant and the instrument panel (not shown) located in front of the knees, thereby to quickly restrain the knees.

In this embodiment in which the entirety of the lid 82 forms a part of the airbag door 44D, the airbag door 44D can be provided in the side wall 44S of the column cover 14 while the lid 82 for closing the opening 44K is provided in the side wall 44S of the column cover 14. With this arrangement, the knee airbag 16 may be smoothly deployed toward the outside of the column cover 14 in the vehicle width direction.

Figure 13:
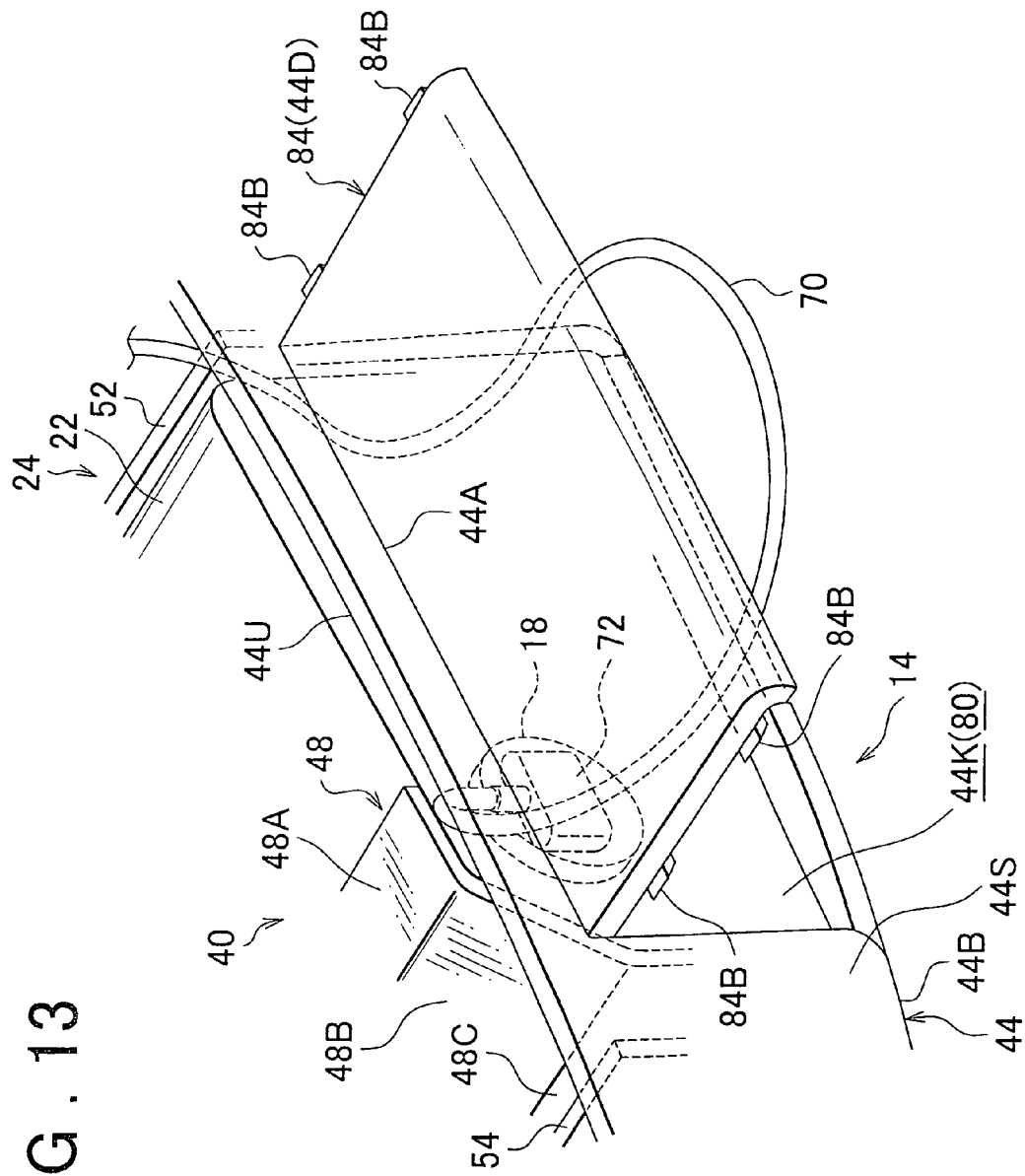
FIG. 13 is an enlarged perspective view showing the wire harness connector when connected to the inflator connector, using an opening formed when a lid is open according to a fourth embodiment of the invention.

In a steering column mounted knee airbag device 40 according to a fourth embodiment of the invention, as shown in FIG. 13, an opening 44K (see FIG. 2) is formed in the side wall 44S of the lower cover 44. The opening 44K is formed in the side wall 44S as a rectangular through-hole, for example. In this embodiment, a lid 84 for closing the opening 44K also serves as an airbag door. Also, the opening 44K further serves as an opening 80 formed in the side wall 44S of the lower cover 44 when the airbag door is opened. Accordingly, tear lines along which the side wall 44S of the lower cover 44 is expected to be torn need not be provided at the periphery of the lid 84.

After the connector 72 of the wire harness 70 is connected to the connector 68 (see FIG. 2) of the inflator 18, engaging protrusions 84B, or the like, of the lid 84 are engaged with the peripheral portion of the opening 44K, so that the opening 44K is closed by the lid 84. For example, a pair of engaging protrusions 84B are provided on each of front and rear end portions of the lid 84. When the inflation pressure of the knee airbag 16 is applied to the lid 84 (airbag door), the engaging protrusions 84B are disengaged from the peripheral portion of the opening 44K.

The lid 84 is integrally formed in the lower cover 44, and is set in a region of the side wall 44S of the lower cover 44 of the column cover 14 that is opposite, for example, the knee airbag module 24 in the vehicle width direction. Also, the lid 84 is pivotable about an upper-end hinge portion 44A as an integral hinge of the lower cover 44.

The other components of the knee airbag device 40 of the fourth embodiment are similar to those of the first embodiment, and therefore, the same reference numerals used in the first embodiment are used to identify the same portions or elements, for which no explanation will be provided.

The operation of the fourth embodiment constructed as described above will now be described. In the steering column mounted knee airbag device 40 according to the fourth embodiment, as shown in FIG. 13, the opening 44K is formed in the side wall 44S of the lower cover 44. The lid 84 is integrally formed in the lower cover 44, and is pivotable about the hinge portion 44A. With this arrangement, by opening the lid 84 and using the opening 44K, the connector 72 of the wire harness 70 may be easily connected to the connector (not shown) of the inflator 18.

Accordingly, when the knee airbag module 24 is installed on the lower cover 44, there is no need to connect a sub wire harness (not shown) to an end of the inflator 18. In this embodiment, in particular, the lid 84 also serves as the airbag door, and the opening 44K is larger than those of the first, second and third embodiments. Therefore, the ease of handling the wire harness 70 is improved, thus improving work efficiency.

Figure 14:
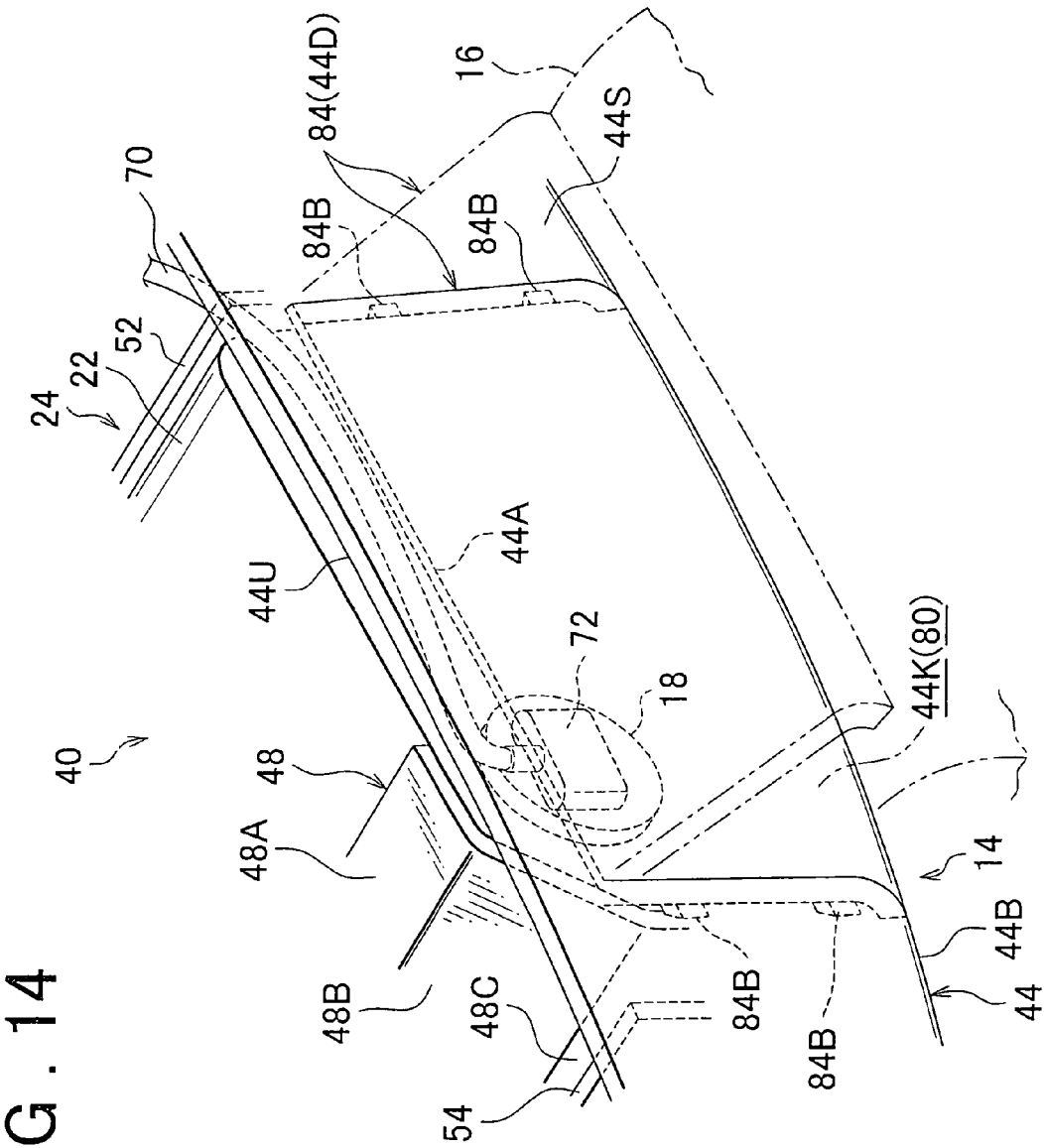
FIG. 14 is an enlarged perspective view showing the lid when closed, and showing, by means of imaginary lines, an airbag door that also serves as the lid when open, and a knee airbag is deployed toward the outside of the column cover in the vehicle width direction, in the fourth embodiment of FIG. 13.

After the wire harness 70 is connected to the inflator 18, the wire harness 70 is pulled into the lower cover 44, and the engaging protrusions 84B of the lid 84 are engaged with the peripheral portion of the opening 44K, as shown in FIG. 14. In this manner, the opening 44K may be easily closed. With the opening 44K thus closed by the lid 84, the outer surface of the lid 84 is flush with the outer surface of the side wall 44S of the lower cover 44, and the lid 82 appear to be integrated with the lower cover 44. Thus, the lid 82 does not degrade the appearance of the column cover 14.

In this embodiment in which the lid 84 is integrally formed in the lower cover 44 via the hinge portion 44A, the provision of the lid 84 does not increase the number of parts or components, and the opening 44K is closed by the lid 84 with improved efficiency and ease.

When the knee airbag 16 is deployed, the inflation pressure of the knee airbag 16 is applied to the lid 84. Then, the engaging protrusions 84B of the lid 84 are disengaged from the peripheral portion of the opening 44K. As a result, the lid 84 opens toward the outside of the column cover 14 in the vehicle width direction while pivoting about the upper-end hinge portion 44A of the lid 84. The knee airbag 16 is deployed toward the outside of the column cover 14 in the vehicle width direction through an opening 80, formed when the lid 84 opens. As a result, the knee airbag 16 promptly enters the space between the knees (not shown) of the occupant and the instrument panel (not shown) located in front of the knee, thereby to quickly restrain the knees.

Figure 15:
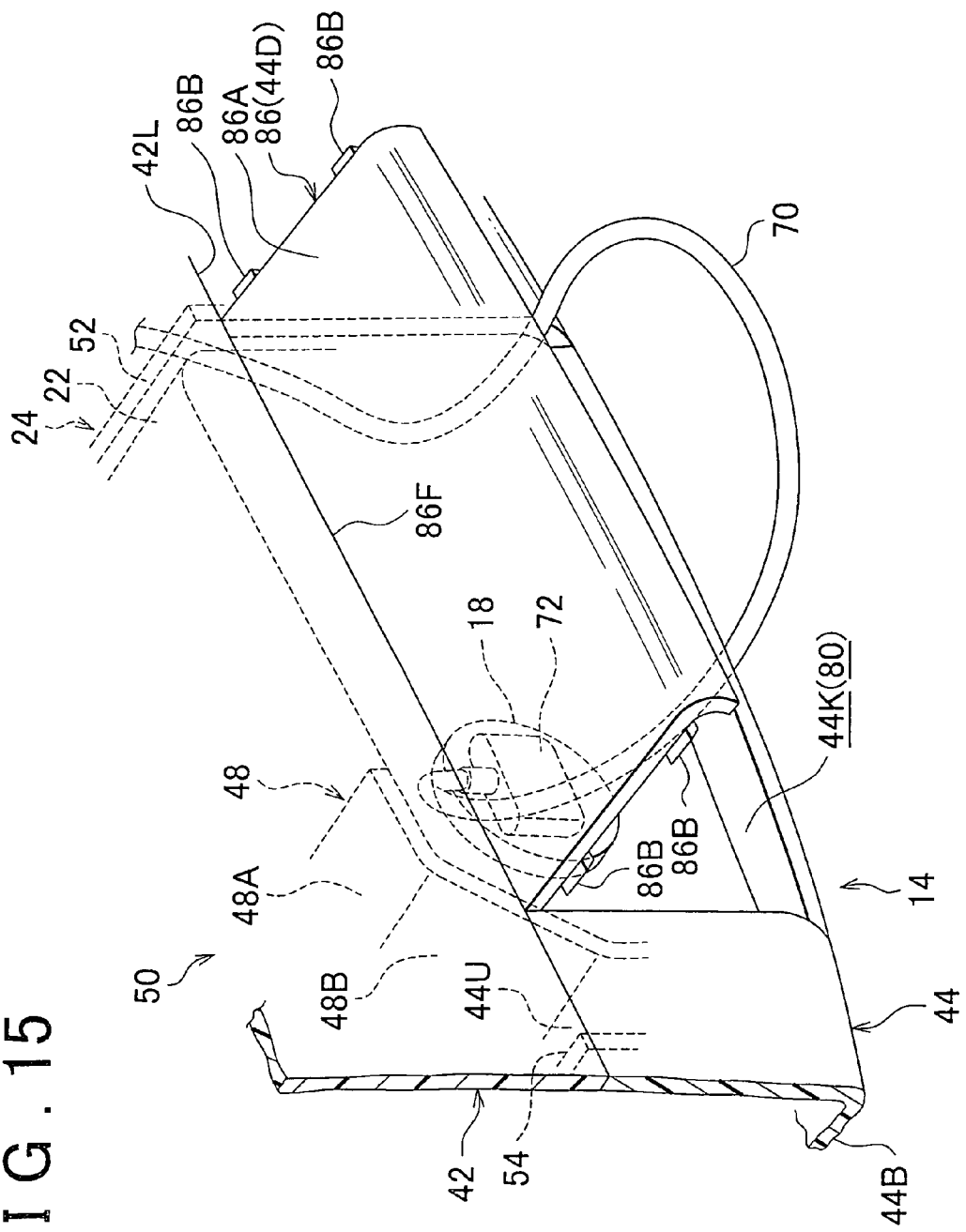
FIG. 15 is an enlarged perspective view showing the wire harness connector when connected to the inflator connector, using an opening formed when a lid is open according to a fifth embodiment of the invention.

In a steering column mounted knee airbag device 50 according to a fifth embodiment of the invention, as shown in FIG. 15, a lid 86 for closing the opening 44K also serves as an airbag door, as in the fourth embodiment, but is formed independently of the upper cover 42 and the lower cover 44, as shown in FIG. 16.

On the inner surface of the upper cover 42, claws 42A, for example, are provided at three locations such that the claws 42A are arranged in series in the direction of the axis L of the steering column 12 (see FIG. 1). The upper portion 86C of the lid 86 is engaged with the claws 42. More specifically, the lid 86 includes a general portion 86A that is flush with the outer surface of the side wall 44S when the opening 44K is closed, and also includes the upper portion 86C that is located inwardly of the general portion 86A in the width direction of the column cover 14, to be placed in the inside of the upper cover 42. The upper portion 86C of the lid 86 extends upward in the vertical direction of the vehicle from the lower end 42L of the upper cover 42, and terminates at a predetermined vertical position. The upper portion 86C of the lid 86 is formed with through holes 86D in which the claws 42A are engaged.

A stepped portion 86E between the general portion 86A and the upper portion 86C is adjacent and opposed to or abuts on the lower end (or bottom face) 42L of the upper cover 42. A boundary portion between the stepped portion 86E and the general portion 86A provides a hinge portion 86F about which the lid 86 (air bag door) is opened and closed. The hinge portion 86F is an integral hinge.

After the connector 72 of the wire harness 70 is connected to the connector 68 (see FIG. 2) of the inflator 18, engaging protrusions 86B, or the like, of the lid 86 are engaged with the peripheral portion of the opening 44K, so that the opening 44K is closed by the lid 86. For example, a pair of engaging protrusions 86B are provided on each of front and rear end portions of the lid 86. When the inflation pressure of the knee airbag 16 is applied to the lid 86 (airbag door), the engaging protrusions 86B are disengaged from the peripheral portion of the opening 44K.

The other components of the knee airbag device 50 of the fifth embodiment are similar to those of the first embodiment or the fourth embodiment, and therefore, the same reference numerals used in the first or fourth embodiment are used to identify the same portions or elements, for which no explanation will be provided.

The operation of the fifth embodiment constructed as described above will now be described. In the steering column mounted knee airbag device 50 according to the fifth embodiment, as shown in FIG. 15, the opening 44K is formed in the side wall 44S of the lower cover 44. The lid 86 is attached to the upper cover 42 and is pivotable about the hinge portion 86F. With this arrangement, by opening the lid 86 and using the opening 44K, the connector 72 of the wire harness 70 may be easily connected to the connector (not shown) of the inflator 18.

Accordingly, if the knee airbag module 24 is installed on the lower cover 44, there is no need to connect a sub wire harness (not shown) to an end portion of the inflator 18. In this embodiment, in particular, the lid 86 also serves as the airbag door, and, as in the fourth embodiment, the opening 44K is larger than those of the first, second and third embodiments. Therefore, the ease of handling the wire harness 70 is increased, thus improving work efficiency.

After the wire harness 70 is connected to the inflator 18, the wire harness 70 is pulled into the lower cover 44, and the engaging protrusions 86B of the lid 86 are engaged with the peripheral portion of the opening 44K, as shown in FIG. 16. In this manner, the opening 44K may be easily closed. With the opening 44K thus closed by the lid 86, the outer surface of the general portion 86A of the lid 86 is flush with the outer surface of the side wall 44S of the lower cover 44, and the lid 86 appear to be integrated with the lower cover 44. Thus, the lid 86 does not degrade the appearance of the column cover 14.

When the knee airbag 16 is deployed, the inflation pressure of the knee airbag 16 is applied to the lid 86. Then, the engaging protrusions 86B of the lid 86 are disengaged from the peripheral portion of the opening 44K. As a result, the lid 86 opens toward the outside of the column cover 14 in the vehicle width direction while pivoting about the hinge portion 86F of the lid 86. The knee airbag 16 is thus deployed through the resulting opening 80 toward the outside of the column cover 14 in the vehicle width direction. As a result, the knee airbag 16 promptly enters the space between the knees (not shown) of the occupant and the instrument panel (not shown) located in front of the knees, thereby to quickly restrain the knees.

In the second through fourth embodiments, the airbag door 44D provided in the side wall 44S opens when the knee airbag 16 is deployed. In the fifth embodiment, the lid 86 serving as the airbag door and provided in the side wall 44S opens when the knee airbag 16 is deployed. In addition, part of the bottom wall 44B of the lower cover 44 may serve as an airbag door and open when the knee airbag 16 is deployed, as in the first embodiment.

The front-end position of the opening 44K in the fourth embodiment and the fifth embodiment is not limited to those as shown in FIG. 13, 15, but may be set to a position located frontwardly of the knee airbag module 24 in the direction of the axis L of the steering column 12 (see FIG. 1). This arrangement is preferable because the wire harness 70 may be easily pulled out of the lower cover 44 when it is connected to the inflator 18.

What is claimed is:

1. A knee airbag device mounted on a steering column of a vehicle, comprising:
   a knee airbag module that is fixed to a vehicle lower side of the steering column, and includes a folded knee airbag, an inflator that supplies gas to the knee airbag, and a module case that houses the knee airbag and the inflator;
   a wiring connector provided at one end of the inflator;
   a connector of a wiring harness that extends from the steering column and connects with the wiring connector provided at one end of the inflator;
   a column cover that covers a rear end portion of the steering column;
   a notch that provides a working space for connecting the connector of the wire harness and the wiring connector provided at the one end of the inflator, the notch being formed in a side wall of a lower cover that forms a lower portion, with respect to the vehicle, of the column cover, at a location opposite the wiring connector so as to be open on an upper side, with respect to the vehicle, of the side wall; and
   a lid that closes the notch after the wiring harness is connected, the lid being formed on an upper cover that provides a vehicle-upper-side portion of the column cover so as to protrude downward, with respect to the vehicle, from a vehicle-lower side end portion of the upper cover and being mounted in the notch from the upper side with respect to the vehicle.

* * * * *